United States Patent [19]

Devins et al.

[11] Patent Number: 4,842,941

[45] Date of Patent: Jun. 27, 1989

[54] METHOD FOR FORMING ABRASION-RESISTANT POLYCARBONATE ARTICLES, AND ARTICLES OF MANUFACTURE PRODUCED THEREBY

[75] Inventors: John C. Devins, Burnt Hills; Clive W. Reed, Scotia; Stefan J. Rzad, Rexford, all of N.Y.

[73] Assignee: General Electric Company, Schenectady, N.Y.

[21] Appl. No.: 34,890

[22] Filed: Apr. 6, 1987

[51] Int. Cl.$^4$ .................. B32B 27/36; B05D 3/06; B05D 5/06
[52] U.S. Cl. .................. 428/412; 427/39; 427/40; 427/162; 427/164; 427/419.2; 427/419.7
[58] Field of Search ............. 429/39, 40, 41, 162, 429/163, 164; 428/412; 427/419.2

[56] References Cited

U.S. PATENT DOCUMENTS

| | | |
|---|---|---|
| 13,869 | 1/1973 | Geffcken et al. |
| 4,096,315 | 6/1978 | Kubacki .................. 428/412 |
| 4,137,365 | 1/1979 | Wydeven et al. .......... 427/41 |
| 4,190,681 | 2/1980 | Hall et al. |
| 4,200,681 | 4/1980 | Hall et al. |
| 4,218,508 | 8/1980 | Humphrey, Jr. .......... 428/412 |
| 4,260,647 | 4/1981 | Wang et al. |
| 4,294,871 | 10/1981 | Hieber et al. ............ 427/237 |
| 4,328,646 | 5/1982 | Kaganowicz |
| 4,341,841 | 7/1982 | Ohno et al. ............. 428/414 |
| 4,374,674 | 2/1983 | Ashby et al. ............ 106/287.14 |
| 4,419,405 | 12/1983 | Ashby et al. ............ 428/412 |
| 4,465,738 | 8/1984 | Chang ................... 427/41 |
| 4,478,873 | 10/1984 | Masso et al. ............ 427/41 |
| 4,493,855 | 1/1985 | Sachdev et al. .......... 427/41 |
| 4,544,582 | 10/1985 | Benjamin ................ 428/412 |
| 4,568,563 | 2/1986 | Jackson et al. .......... 427/40 |
| 4,571,365 | 2/1986 | Ashlock et al. .......... 428/412 |
| 4,594,079 | 6/1986 | Yamamoto et al. ........ 427/41 |
| 4,600,640 | 7/1986 | Olson .................... 428/412 |
| 4,600,649 | 7/1986 | Leo ...................... 428/412 |
| 4,615,947 | 10/1986 | Goossens ................ 428/412 |

OTHER PUBLICATIONS

D. W. Hess, *J. Vac. Sci. Technol.*, Apr.–Jun. 1984, "Plasma-Enhanced CVD: Oxides, Nitrides, Transition Metals, and Transition Metal Silicides", pp. 244–252.

J. L. Vossen, *J. Electrochem. Soc.*, Feb. 1979, Vol. 126, No. 2, "Glow Discharge Phenomena in Plasma Etching and Plasma Deposition", pp. 319–324.

Bunshah et al., *Deposition Technologies For Films and Coatings*, (Noyes, Park Ridge NJ)c. 1982 pp. 365–385, pp. 525–526.

*Primary Examiner*—Norman Morgenstern
*Assistant Examiner*—Margaret Bueker
*Attorney, Agent, or Firm*—Mary Ann Montebello; James C. Davis, Jr.; William H. Pittman

[57] ABSTRACT

An abrasion-resistant article and method for making is disclosed. The article includes a polycarbonate substrate, an interfacial layer of an adherent resinous composition on the substrate, and an abrasion-resistant top layer applied on the interfacial layer by plasma-enhanced chemical vapor deposition.

2 Claims, No Drawings

METHOD FOR FORMING ABRASION-RESISTANT POLYCARBONATE ARTICLES, AND ARTICLES OF MANUFACTURE PRODUCED THEREBY

BACKGROUND OF THE INVENTION

This invention relates generally to polycarbonate articles, and more particularly to polycarbonate articles exhibiting improved abrasion resistance.

Polycarbonate resins are well-known, commercially available materials possessing physical and chemical properties which are useful in a wide variety of applications. Because of their excellent breakage resistance, polycarbonates have replaced glass in many products, such as automobile headlamps and stoplight lenses; safety shields in windows, architectural glazing, and the like. However, a major defect exhibited by polycarbonates is their very low scratch-resistance and susceptibility to ultraviolet light-induced degradation.

Methods for improving the scratch-resistance of thermoplastics such as polycarbonate have involved disposing an inorganic protective layer on the surface of the polycarbonate. For example, in U.S. Pat. No. 4,328,646, issued to Kaganowicz, an abrasion-resistant article is formed by subjecting a mixture of hard coating precursors to a glow discharge, and depositing the product directly on a plastic substrate as a very thin film. However, the absence of an intermediate layer between the substrate and the hard coating layer often results in surface cracking when the article is exposed to various heating/cooling cycles.

U.S. Pat. No. 4,200,681, issued to Hall et al., disclosed the vapor deposition of a top layer of glass ($SiO_2$) onto an intermediate primer layer which in turn has been deposited on the surface of a polycarbonate substrate. However, the evaporative technique of applying a layer of $SiO_2$ is often undesirable for several reasons. For example, the individual particles of $SiO_2$ may evaporate and later condense on the coating surface at rates which vary with the particular site of deposition, resulting in a nonuniform glass surface often characterized by pits, pinholes, and other imperfections. Furthermore, this technique generally permits only line-of-site deposition, and curved or indented surfaces would thus exhibit undesirable variations in glass coating thickness. Moreover, evaporative deposition methods like those of Hall et al. do not generate reactive film-forming species which can react with the underlying surface to form a very adherent coating. These methods also require extremely low operating pressures which are sometimes difficult to maintain during deposition, and cause undesirable outgassing of the polycarbonate.

U.S. Pat. No. 3,713,869, issued to Geffcken et al., teaches the deposition of an intermediate layer polymerized by glow discharge onto a polycarbonate surface. A hard inorganic layer is then vaporized by an electron beam gun onto the intermediate layer in a manner similar to that used by Hall et al., and having the same deficiencies discussed above.

There is thus a continuing interest in improved methods for forming abrasion-resistant polycarbonate articles having still greater abrasion resistance, while also exhibiting improvements in various other physical properties.

It is therefore an object of the present invention to provide a method for forming polycarbonate articles having a high level of abrasion resistance.

It is another object of the present invention to provide an improved method for applying smooth, hard, transparent layers of uniform thickness over a polycarbonate substrate.

It is yet another object of the present invention to provide an abrasion-resistant polycarbonate article having disposed thereover a top layer characterized by uniform thickness, high abrasion resistance, and freedom from pinholes and microcracks.

SUMMARY OF THE INVENTION

The foregoing objects have been achieved by the discovery of an improved method for forming an abrasion-resistant plastic article having a polycarbonate substrate; an interfacial layer comprised of an adherent resinous composition on the substrate; and an abrasion-resistant top layer. The method comprises the steps of:

(a) applying the interfacial layer on the surface of the substrate (which may be primed or unprimed); and (b) applying the top layer on the interfacial layer by plasma-enhanced chemical vapor deposition, hereinafter also referred to as PECVD.

The interfacial layer of the present invention may be formed of a variety of materials, and may be applied to the substrate by coating means. Alternatively, the interfacial layer may be applied to the substrate by PECVD, as further described below.

The abrasion-resistant top layer may comprise a wide variety of materials described in detail below.

In brief, PECVD as employed herein involves situating the substrate in a reactor chamber; and then passing at least one gaseous reactant capable of forming the desired layer through the chamber in a laminar flow relative to the coating surface, and at a suitable pressure, generating an electric field to form a plasma with the reactants. The gaseous reactants react in the plasma and on the coating surface to form the desired layer. It is to be understood that "surface", "coating surface" or "deposition surface" as used herein refers to the substrate surface or primer surface when the interfacial layer is being applied, and refers to the interfacial layer surface when the top layer is being applied, unless otherwise indicated.

Use of the method of the present invention results in polycarbonate articles having all of the typical attributes of polycarbonates, such as high tensile and impact strength, while also exhibiting excellent abrasion resistance. Furthermore, a high level of adhesion results between the abrasion-resistant top layer and the polycarbonate substrate because of the presence of the interfacial layer therebetween.

Moreover, unlike conventional vapor deposition processes which require high operating temperatures often damaging to polycarbonate material, PECVD can be carried out as disclosed herein at temperatures which are harmless to polycarbonate. "Conventional" vapor deposition processes as used herein denotes both CVD processes in which coating material precursors react in the gas phase at elevated temperatures, typically above 400° C.; and also denotes "physical vapor deposition" processes in which preformed coating materials are simply evaporated onto a substrate. These processes do not involve the use of a plasma.

DETAILED DESCRIPTION OF THE INVENTION

The article formed by the method of the present invention includes a polycarbonate substrate. Polycarbonate materials suitable for forming such a substrate are well-known in the art and are described, for example, in U.S. Pat. Nos. 4,200,681 and 4,210,699, both incorporated herein by reference. Some polycarbonates generally comprise repeating units of the formula

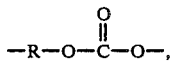

in which R is a divalent radical of a dihydric phenol, e.g., a radical of 2,2-bis(4-hydroxyphenyl)-propane, also known as bisphenol A,

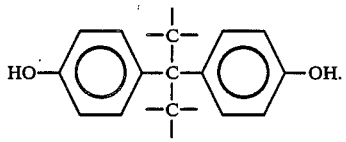

Polycarbonates within the scope of the present invention may be prepared by several well-known methods. For example, preparation may be accomplished by reacting a dihydric phenol with a carbonate precursor. A wide variety of dihydric phenols, such as biphenol A, may be used in the present invention; many are disclosed in U.S. Pat. Nos. 2,999,835; 3,082,365; 3,160,121; 3,334,154; and 4,190,681, all incorporated herein by reference. Many carbonate precursors may be used; they are typically either a carbonyl halide, a carbonate ester, or a haloformate. Exemplary carbonate precursors are described in U.S. Pat. No. 4,190,681.

The polycarbonate substrate may be shaped into a variety of forms, depending on the end use contemplated for the articles. For example, a polycarbonate film substrate may be formed by casting the molten polymer onto a flat open mold, and then pressing the material to a uniform thickness. After cooling, the film may then have an interfacial layer applied thereover, as further described below. Furthermore, the polycarbonate substrate may be in the form of tubes, rods, or irregular shapes. When the article of the present invention is to be used as a glazing material, the polycarbonate material may be formed into flat or curved sheets by well-known methods, e.g., extrusion or injection molding.

As mentioned above, the interfacial layer is applied over the surface of the polycarbonate substrate by the method of the present invention. "Interfacial layer" as used herein is meant to define a layer of an adherent resinous composition disposed between the top layer of the present invention and the substrate. The surface of the interfacial layer will be in contact with the subsequently-applied top layer. The opposite surface of the interfacial layer may or may not be in contact with the facing surface of the substrate, depending on the presence or absence of a primer on the substrate surface, as further described below.

The composition of the interfacial layer of the present invention will depend on both the end use contemplated for the article and the manner in which the interfacial layer is to be applied over the polycarbonate substrate.

One of the important functions of the interfacial layer in preferred embodiments of the present invention is to act as an incorporation site for one or more ultraviolet light (UV) absorbers. By concentrating the absorbers in the relatively thin interfacial layer, the underlying polycarbonate is more efficiently protected from UV light than in those instances in which the absorbers are dispersed throughout the polycarbonate itself.

Organosilicons are particularly useful materials for forming the interfacial layer. "Organosilicon" as used herein is meant to embrace organic compounds in which at least one silicon atom is bonded to at least one carbon atom, and includes silicon materials, as well as materials commonly referred to as silanes, siloxanes, silazanes, and organosilicones. Organosilicones suitable for the method and article of the present invention are described in *Organosilicon Compounds*, C. Eaborn, Butterworths Scientific Publications, 1960. Other suitable organosilicon compounds are described in *Organic Polymer Chemistry*, K. Saunders, Chapman and Hall Ltd., 1973.

Non-limiting examples of organosilicon compositions useful for the present invention are the partial hydrolysis and condensation products of compounds represented by the general formula

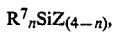

wherein $R^7$ represents a monovalent hydrocarbon radical or a halogenated monovalent hydrocarbon radical, Z represents a hydrolyzable group, and n may vary between 0 and 2. More specifically, Z is preferably a member such as halogen, alkoxy, acyloxy, or aryloxy. Such compounds are well-known in the art and are described, for example, in S. Schroeter et al.'s U.S. Pat. No. 4,224,378, incorporated herein by reference.

Other exemplary organosilicons falling within the scope of the present invention include the partial condensate of a silanol having the formula

wherein $R^8$ is selected from the group consisting of alkyl radicals containing from about 1 to about 3 carbon atoms, the vinyl radical, the 3,3,3-trifluoropropyl radical, the gamma-glycidoxypropyl radical and the gamma-methacryloxypropyl radical, with at least about 70% by weight of the silanol being $CH_3Si(OH)_3$. Such compounds are described in U.S. Pat. No. 4,242,381, incorporated herein by reference.

Preferred organosilicon compounds for the present invention when the interfacial layer is to be PECVD-applied as described below are hexamethyldisilazane, hexamethyldisiloxane, vinyltrimethylsilane and octamethylcyclotetrasiloxane. The monomer vapor of these compounds is polymerized in the plasma to form the interfacial layer, as further described below.

When greater hardness for the organosilicon-based interfacial layer is desired, the organosilicon material may have dispersed therein colloidal silica. Dispersions of colloidal silica in organosilicon materials are well-known in the art, and are described, for example, in U.S. Pat. Nos. 3,986,997, 4,027,073, 4,239,798, 4,284,685, 4,436,851, all incorporated herein by reference. Typically, the colloidal silica is dispersed in an aqueous solution of the organosilicon. For example, these compounds may comprise a dispersion of colloidal silica in a lower aliphatic (e.g., less than about 6 carbon atoms)

alcohol-water solution of the partial condensate of a silanol.

When used, colloidal silica should comprise about 5% to about 70% by weight of the total nonvolatile weight of the interfacial layer. Furthermore, aqueous colloidal silica dispersions used in the present invention generally have a particle size in the range of about 5 to about 150 nanometers in diameter. An especially preferred particle size range is from about 5 to about 30 nanometers in diameter.

An especially preferred colloidal silica-containing organosilicon material for use as the interfacial layer is described in B. Ashby et al.'s U.S. Pat. No. 4,374,674, incorporated herein by reference, and comprises:

(a) a dispersion of colloidal silica in a solution of the partial condensate of a silanol having the formula RSi(OH)$_3$ or R$_2$Si(OH)$_2$, wherein R is selected from the group consisting of alkyl groups having about 1 to 3 carbon atoms and aryl groups having about 6 to 20 carbon atoms, wherein at least 70 weight percent of the silanol is CH$_3$Si(OH)$_3$ or (CH$_3$)$_2$Si(OH)$_2$ in a mixture of an aliphatic alcohol and water, said dispersion containing from 10 to 50 percent by weight of solids, said solids consisting essentially of 10 to 70 percent by weight of the colloidal silica and 30 to 90 percent by weight of the partial condensate, and (b) an effective amount of an ultraviolet light absorbing agent comprising a compound having the formula

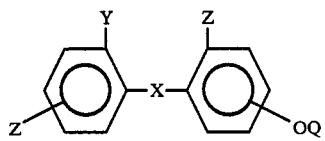

wherein:
X is

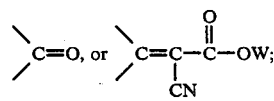

Y is H or OH;
Z is H, OH, OQ or OW, where at least one Z is OH if Y is H;
Q is —CH$_2$(CH$_2$)$_n$Si(R$^2$)$_x$(OR$^1$)$_y$; and
W is —C$_m$H$_{2m+1}$;
where x=0, 1 or 2, y=1, 2, or 3, x+y=3, and R$^1$ is an alkyl or alkanoyl group having about 1 to 6 carbon atoms, R$^2$ is an alkyl group having from about 1 to 6 carbon atoms, n=0, 1 or 2 and m=1 to 18. The composition forming this material typically contains sufficient acid to provide a pH in the range of about 3.0 to 7.0. The Ashby et al. patent also describes methods of applying and curing these coatings.

Exemplary condensates of R$_2$Si(OH)$_2$-type silanols, and compositions formed therefrom, are disclosed in U.S. Pat. No. 4,159,206, incorporated herein by reference.

Another preferred organosilicon material for use as the interfacial layer comprises a water/aliphatic alcohol dispersion of ammonium hydroxide-stabilized colloidal silica and a partial condensation derived from organotrialkoxy silanes. Such a material is described by B. Anthony in U.S. Pat. No. 4,624,870, incorporated herein by reference, and is preferably used at an alkaline pH, i.e., a pH of at least about 7.1.

Organosilicon materials containing colloidal silica are generally not applied by PECVD, but are instead conventionally coated onto the substrate, as described below.

The interfacial layer formed by the method of the present invention may alternatively comprise an acrylic material as the adherent resinous composition, i.e., thermoplastic or thermoset acrylic polymers. "Acrylic" embraces herein compounds containing acrylic functionalities along with other types of molecular groups; an example of this type of acylic is the acryloxy functional silane described below.

Exemplary acrylic materials are those which are ultraviolet light (UV)-curable. These materials are typically applied to the polycarbonate substrate as a monomer. A preferred composition of this type comprises:

(A) at least one polyfunctional acrylate monomer represented by the general formula

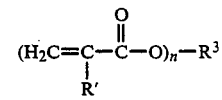

wherein n is an integer having a value of from 1 to 4, and R$^3$ is selected from the group consisting of aliphatic hydrocarbon groups, an aliphatic hydrocarbon group containing at least one ether linkage, and a substituted aliphatic hydrocarbon group containing at least one ether linkage; and R' is selected from hydrogen or lower alkyl radicals;

(B) colloidal silica, (C) at least one acryloxy functional silane of the formula

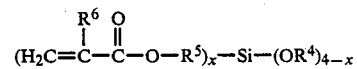

wherein R$^4$ is a monovalent hydrocarbon radical, R$^5$ is a divalent hydrocarbon radical, R$^6$ is selected from the group consisting of hydrogen atoms and monovalent hydrocarbon radicals, x is an integer of from 1 to 4 inclusive; and (D) a photoinitiator.

After the composition is applied to the substrate, it is exposed to ultraviolet light for a period of time sufficient to polymerize and crosslink the polyfunctional acrylate monomers, thereby forming a cured coating. Ketones are useful as initiators when curing the acrylic compositions in inert atmospheres such as nitrogen, while blends of at least one ketone and at least one amine are useful as initiators when curing in oxygen-containing atmospheres, as described in R. Chung's U.S. Pat. No. 4,478,876, incorporated herein by reference.

The UV-curable materials are described in greater detail in R. Chung's U.S. Pat. Nos. 4,486,504; and 4,372,835, all incorporated herein by reference. Other suitable UV-curable acrylic-containing materials are described in D. Olson et al.'s U.S. Pat. Nos. 4,455,205 and 4,491,508, also incorporated herein by reference. Suitable methods for applying and curing these materials are more fully described in the referenced patents.

Other thermosettable acrylic polymers suitable for the present invention are described in the *Encyclopedia* of *Polymer Science and Technology*, Volume I, Interscience Publishers, John Wiley and Sons, Inc., 1964, and in *Chemistry of Organic Film Formers*, by D. Solomon, John Wiley and Sons, Inc., 1967, as well as references cited in each of the above texts. Furthermore, U.S. Pat. No. 4,242,383, also incorporated herein by reference, describes suitable thermosettable acrylic polymers.

As discussed above, a thermoplastic acrylic material may comprise the interfacial layer. Among the suitable thermoplastic acrylics are those which are polymerized prior to being coated onto the substrate. Exemplary acrylics of this type are those formed by polymerizing at least one monomer selected from the group consisting of acrylic acid esters and methacrylic acid esters. These and other suitable thermoplastic acrylic materials are described in greater detail in S. Schroeter et al.'s U.S. Pat. No. 4,239,798, incorporated herein by reference. Copolymers formed from acrylate or methacrylate monomers are also included within the meaning of "thermoplastic acrylic polymers" as used herein.

The acrylic compositions forming the interfacial layer may also include an ultraviolet light absorber. Exemplary absorbers are those of the hydroxy benzophenone and benzotriazole type, although other UV absorbers might also be used. The amount of UV absorber depends in part on the particular composition of the acrylic, and in part on whether a UV absorber is also present in a primer layer and/or in the substrate material itself.

The acrylic compositions may be applied by the PECVD technique described below if their reactant precursors are vaporizable. For example, an acrylic acid ester monomer or methacrylic acid ester monomer may be vaporized and then plasma-polymerized to form a polymeric coating which is deposited on the underlying coating surface.

The interfacial layer may alternatively be formed by a polyolefin. Nonlimiting examples of suitable polyolefins include polyethylene, polypropylene, polyisoprene, and copolymers of these types of materials. Further included within the broad definition of polyolefin as used herein are synthetic and natural elastomers, many of which are described in the *Encylopedia of Polymer Science and Technology*, Vol. 5, pp. 406–482 (1966), the disclosure of which is incorporated by reference herein. Many of these materials can be deposited according to the present invention by vaporizing and then plasma-polymerizing their monomer precursors under the plasma conditions described below.

In forming the abrasion-resistant article of the present invention, the interfacial layer may be applied over the surface of the substrate by conventional methods well-known in the art, e.g., spraying, roll coating, curtain coating, dip coating, and brushing. If a primer is not applied to the surface of the polycarbonate substrate, the interfacial layer material will be applied directly to the substrate surface (which is typically first cleaned and pretreated as described below). For example, the surface may be coated with a further-curable organopolysiloxane dissolved in organic solvent solution. The volatile solvents are then evaporated by well-known methods, and the organopolysiloxane is thermally cured on the polycarbonate. Various other known coating processes are more fully explained in U.S. Pat. Nos. 3,986,997 and 4,242,383, each incorporated herein by reference.

As mentioned above, a primer may be applied to the surface of the substrate prior to the application of the interfacial layer. This layer tends to increase the adhesion of the interfacial layer to the polycarbonate surface.

Various well-known materials may be used to form the primer, with the proviso that they may be chemically compatible with both the polycarbonate and the interfacial layer material. Preferred primer materials are the thermoplastic and thermoset acrylic polymers discussed above, although the primer material generally exhibits some compositional differences from the interfaciallayer material.

The particular details of forming and applying the primer are well-known in the art. For example, an acrylic composition may be formed by first preparing an emulsion containing water, a hydroxy ether or alkanol, the acrylic polymer, and other well-known additives necessary for the particular end use of the article, such as an ultraviolet light absorbing compound like those described above. After the mixture has been applied to the polycarbonate surface, a substantial portion of the water and hydroxy ether or alkanol component are then evaporated. The resulting solvent layer containing the acrylic polymer and additives may then be thermally cured to form the primer, as described in detail in U.S. Pat. No. 4,242,383.

As discussed above, the interfacial layer may be applied on the substrate or "over" the substrate, i.e., onto the surface of a primer coating disposed on the substrate. The application may be accomplished by the conventional methods discussed above or by the PECVD technique used to deposit the top layer. PECVD in general is a well-known method of applying films from a gaseous discharge to a substrate. For example, the *Kirk-Othmer Encyclopedia of Chemical Technology*, Volume 10, discusses the plasma deposition of inorganic materials. Furthermore, details regarding the plasma deposition of inorganic thin films are given in *Thin Film Processes*, Ed. by Vossen and Kern, Academic Press, 1978. Exemplary plasma deposition methods are also described in U.S. Pat. Nos. 4,096,315, 4,137,365, 4,361,595, and 4,396,641. While all of the above-listed references generally describe plasma deposition, the process disclosed herein must be carried out according to the various operating parameters discussed below in order to obtain a polycarbonate article having excellent abrasion resistance, optical properties, and adhesion between its layers.

The following general statement regarding the operation of PECVD for the present invention applies to both the deposition of the interfacial layer and the top layer, the formation of the latter being described in detail below. When a discharge is produced at low pressure in the film-forming gaseous reactants, the reactants become ionized, forming a plasma. A portion of the material is in the form of ions, electrons, and atomic free radicals generated in the plasma prior to formation of the film over or upon the substrate. Most of the reactive species consist of the atomic free radicals. Although the inventors do not wish to be bound by a specific theory, it is though that at the higer plasma frequencies, e.g., 13.56 mHz, most of the film formation on or over the substrate occurs when the free radical species diffuse out of the plasma to the deposition surface. Thus, free radicals react on or over the primed or unprimed substrate (or on or over the interfacial layer surface) to form the desired layer. A distinct advantage of PECVD over conventional chemical vapor deposition processes lies in the fact that the applied electric field enhances free radical formation, thereby permitting the use of deposition temperatures which are low enough to prevent damage to polycarbonate substrates, i.e., temperatures less than about 130° C. Furthermore, when used under the process conditions disclosed herein, PECVD can be carried out with a much higher percentage of free radicals than is possible with conventional CVD.

One PECVD system suitable for the process disclosed herein is designated as Model 2411, and sold by PlasmaTherm, Inc. However, in order to achieve the excellent results obtained by the present invention, use of this or any other PECVD apparatus must fall within the processing and compositional parameters disclosed herein.

When the interfacial layer or top layer is to be applied by PECVD, the primed or unprimed substrate is placed in a reactor chamber in which an electric field can be generated. The reactor chamber must be capable of being substantially evacuated, i.e., to a pressure of less than or equal to about 1.0 millitorr.

The method of generating and applying the electric field is not critical to this process. For example, the field may be generated by inductive coupling systems, as described, for example, by J. Vossen in *Glow Discharge Phenomena in Plasma Etching and Plasma Deposition*, J. Electrochemical Society, February 1979, pp. 319–324.

A capacitively coupled system may also be used to generate an electric field, and is preferred for use in the present invention. By this method, which is generally described in the Vossen article referred to above, two electrodes are situated within the reaction chamber, and the plasma is formed therebetween. Each electrode may be a plate of a material that is a good electrical conductor, e.g., aluminum. The electrodes preferably each have a planar face parallel to the other electrode.

In preferred embodiments of the present process wherein the capacitively coupled system is utilized, the electrodes are horizontally arranged, i.e., an upper electrode is affixed in the upper region of the reactor chamber with a planar surface facing a planar surface of a lower electrode affixed in the lower region of the vacuum chamber. The spacing between the electrodes depends on the desired strength of the applied electric field, as well as the size of the article being coated. Those skilled in the vapor deposition art appreciate the interrelationship of these processing variables and are therefore able to make adjustments for a particular use of this invention without undue experimentation. In preferred embodiments, the substrate is positioned on the surface of the lower electrode which faces the upper electrode, such that the substrate surface to be coated is parallel to the facing surface of the upper electrode. Those skilled in the art understand that the electrodes might alternatively be arranged vertically or along other geometric planes within the chamber as long as a plasma can be generated therebetween.

Film-forming materials must be in vapor gaseous form for the PECVD process. Vapor reactants, such as acrylic or organosilicone monomers, are vaporized from the liquid form prior to entry into the reactor chamber.

In preferred embodiments, the liquid material may be degassed by cooling it and then subjecting it to a vacuum. Depending on its particular boiling point, the liquid is then heated to ambient temperature or higher in order to provide sufficient positive vapor pressure to flow through a channeling system such as that described below. Alternatively, a carrier gas such as helium can be blown through the liquid to obtain a diluted vapor mixture of desired composition.

Gaseous reactants such as silane or nitrous oxide are suitable in natural form for reaction in the plasma, but are sometimes stored in liquid form beforehand, alone or with a carrier gas, to insure proper metering into the reactor chamber.

The reactor chamber is evacuated prior to entry of the gaseous reactants. Chamber pressures as required for the process of the present invention range from about 50 millitorrs to about 10 torrs, with a preferred pressure of about 0.3 torr to about 0.6 torr when applying an interfacial layer, and about 1.0 torr when applying a top layer.

The gaseous reactants which form the compositions of the coatings of the present invention may be supplied from an external source through a series of inlet pipes into the reactor chamber. The technical particularities of channeling the various gases into the reactor chamber are well-known in the art and need not be described in detail here. For example, each gas inlet may be connected to a central feed line which carries the gases into the reactor chamber. In preferred embodiments, gaseous reactants for the top layer are mixed with a carrier gas such as helium to improve the flow of the reactants into the reactor chamber. The flow of carrier and reactant gases into the reactor may be controlled by mass flow controller valves which are well-known in the art and which serve to both measure the flow of gases and to control such flow. Furthermore, the carrier gas, when used, may be premixed with the gaseous reactants or may be fed into the central feed line by a separate inlet. For example, when silane ($SiH_4$) is used as a reactant for forming silicon dioxide, it may be premixed with helium in a $SiH_4$:He volume ratio ranging from about 2:98 to 20:80. Although a carrier gas is not critical to the present invention, its use improves the uniformity of plasma density and gas pressure within the reactor chamber. Furthermore, use of the carrier gas tends to prevent gas phase particulation of the plasma-formed coating material, and also improves film quality in terms of transparency and abrasion resistance.

When using the capacitively coupled system, the gaseous reactants entering the reactor chamber from the central feed valve are passed between the upper and lower electrodes and over the substrate to be coated. The quality of the coating on or over the substrate, primer, or interfacial layer depends greatly on both the flow rate of the reactants and flow dynamics, i.e., laminar characteristics, as described below. For example, excessive flow rates would force the active, film-forming reactants past the zone above the deposition surface before they react to form the coating on the surface. Conversely, if the flow rate is too small, the film-forming reactants will quickly be depleted and thereby lead to nonuniformities in film thickness. The flow rate of interfacial layer reactants such as acrylic or organosilicone monomers may range from about 5 sccm to about 250 sccm, with about 20 sccm to about 100 sccm being preferred. For coating surfaces larger than about 10 square feet, which might require reactor chambers larger than the PlasmaTherm reactor described below, higher flow rates may be required, e.g., up to about 2000 sccm. The flow rate of reactants forming the abrasion-resistant top layer ranges from about 500 sccm to about 10,000 sccm for each reactant when a carrier gas is used, and from about 50 sccm to about 500 sccm without a carrier gas. Those skilled in the art will be able to easily select a proper flow rate for a particular coating material if the teachings herein are followed.

Laminar flow of the gaseous reactants relative to the deposition surface is of great importance to the present invention because it enhances the uniformity of the coating in terms of thickness and properties such as hardness, clarity, and, for the interfacial layer, adhesive and thermal expansion compensation capabilities.

"Laminar flow" as used herein is defined as smooth and steady flow, i.e., a substantially streamlined flow of gaseous reactants relative to the substrate and characterized by the absence of turbulent flow of reactant molecules. This type of gas flow is described, for example, in *Fluid Mechanics*, by F. White, McGraw-Hill Book Company, 1979, p. 305 et seq., the disclosure of which is incorporated herein by reference. As described in the White text, laminar flow may be generally characterized by a Reynolds value of between about 1 and 1000. In preferred embodiments of this invention, a particularly preferred Reynolds value is about 2.5. Those skilled in the art understand that small areas of turbulence may be present, but do not significantly affect the properties of the deposited coating. Furthermore, as pointed out above, the mass flow of each gas may be regulated by adjustment means to control the laminar flow characteristics of the gaseous reactants.

In preferred embodiments, the coating surface is heated to a temperature between about 100° C. and 130° C. during plasma deposition, 100° C. being the preferred temperature. The heating can be accomplished by a variety of well-known methods. For example, the resistively-heated lower electrode upon which the substrate rests serves to provide heat to the coating surface through the substrate. In some embodiments of this invention, coating surface temperatures of 100° C. or higher increase the deposition rate of the top layer material onto the underlying surface, be it the polycarbonate or the interfacial layer, and produce desirable compressive stresses in the top layer. Furthermore, the elevated temperature may also result enhanced abrasion resistance of the deposited top layer. However, higher temperatures within this range should be avoided if they are detrimental to the quality of the interfacial layer or if they result in stresses between the top layer and the substrate after the coated article is cooled to ambient temperature. It should also be understood that deposition onto a coating surface maintained at between about room temperature and 100° C. is also within the scope of this process.

In preferred embodiments of this invention, the substrate surface may be cleaned by washing with an alcohol solvent such as isopropanol prior to application of the next layer. This step removes dirt, contaminants, and additives such as wetting agents from the surface. The primer surface and interfacial layer surface may also be washed in this manner.

After being washed, the substrate may be vacuum-desiccated by well-known methods to remove any water on or in the surface region which would interfere with the adhesion of the subsequently-deposited layers. The desiccation treatment may also be used on the primer and interfacial layer surfaces after they have been applied to the polycarbonate. Desiccation temperatures range from about ambient temperature to about 120° C., with the preferred range being about 80° C. to about 90° C. Desiccation duration ranges from about 2 hours to about 16 hours, with longer times within this range compensating for lower temperatures, and vice versa. Furthermore, when desiccation is performed on organosilicon-type interfacial layers, temperatures above 100° C. should generally be avoided because they may induce microcracking in the organosilicon.

In preferred embodiments of this invention, the primer surface and the interfacial layer surface are etched after they are placed in the reaction chamber. Etching techniques are well-known in the art. A preferred etching technique is to etch in nitrogen gas alone at about 25° C. to about 100° C. Another useful etching technique is to etch the surface in a mixture of carbon tetrafluoride and oxygen (at approximately 8% by volume $O_2$ in $CF_4$) at about 25° C. to about 100° C., followed by etching in nitrogen gas at those same temperatures. Although the inventors do not wish to be bound by this theory, the etching technique appears to remove a top portion of the coating material and thereby creates free radical species of the surface material which later bond with the free radical species of a material subsequently applied by PECVD, if that type of deposition is carried out.

When an interfacial layer is applied by PECVD and the top layer is then applied to the interfacial layer in the same PECVD chamber, etching of the interfacial layer surface may not be necessary.

As the reactants enter the reaction chamber after the coating surface is treated as described above, an electric field is generated under preselected frequency and power conditions to ionize the gas mix, thereby forming a plasma. Methods of generating an electric field between electrodes are well-known in the art and therefore do not require an exhaustive description here. A dc filed, or an ac field from 50 Hz to about 10 GHz, may be used. Power values range from between about 10 watts to 5000 watts. A particularly suitable electrical field-generating means for this process is the use of a high frequency power supply to initiate and sustain the plasma. When such a power supply is used, a preferred operating frequency is 13.56 MHz, as described, for example, in R. Kubacki's U.S. Pat. No. 4,096,315, incorporated herein by reference. The particular frequency and power values utilized will depend in part on the particular deposition requiremet for the coating material. For example, when organosilicone monomers are reacting in the plasma, lower frequencies and higher electrical power values within the above-described ranges increase the polymerization rate and deposition rate of the organosilicones, especially when lower chamber pressures within the above-mentioned range are also employed.

After passing over the coating surface, the carrier gas and any gas reactants or products which have not been deposited on the substrate surface may be directed out of the chamber through an exit valve and then to a gas pumping and exhaust system. Means for expelling these excess materials from the chamber are well-known in the art. When the electrodes are circular and flat as described above, the exhaust manifold can be located in the center of the lower electrode. Furthermore, after the application of the plasma-deposited layer, residual gases may be removed from the reactor chamber by pumping, as mentioned above.

The thickness of the interfacial layer is in part determined by the contemplted end use of the article, and generally may range from about 0.1 micron to about 6.0 microns, regardless of how it is applied. When the interfacial layer is a conventionally-applied organosilicon material containing colloidal silica dispersed therein as described above, a preferred thickness range is from about 2.0 microns to about 6.0 microns.

After the interfacial layer has been applied over the surface of the substrate, the abrasion-resistant top layer is applied on the interfacial layer by the PECVD method generally described above. Nonlimiting examples of suitable abrasion-resistant materials include silicon dioxide, silicon nitride, silicon oxynitride, silicon carbide, silicon carbonitride, boron oxide, boron nitride, aluminum oxide, aluminum nitride, titanium dioxide, tantalum oxide, iron oxide, germanium oxide, and germanium carbide. When the article is to be used as a glazing material, a silicon dioxide top layer is preferred because of its ease of plasma deposition and the relatively inexpensive cost of its precursors.

Gaseous reactants capable of combining to form the composition of a particular top layer are passed into the PECVD reactor chamber described above. Those skilled in the chemical arts are familiar with a variety of reactants which may be combined for form the top layer of the present invention. For example, silicon dioxide may be formed by the reaction of silane with nitrous oxide; by the reaction of silicon tetrachloride with oxygen; or by the reaction of tetraethoxy silane with oxygen.

As in the case or organosilicon-type deposition, the processing variables for depositing the top layer depend upon the particular top layer utilized, the desired coating thickness, and the desired surface appearance. Flow rates of gaseous reactants forming the top layer range from about 50 sccm to about 10,000 sccm as discussed above. Internal pressure for the reactor chamber during PECVD of the top layer ranges from about 50 millitorrs to about 10 torrs, while dc or ac fields can be used. The ac field can range from about 50 Hz to about 10 GHz, and the power output ranges from about 10 watts to about 5000 watts. Those skilled in the art appreciate that adjustment of each of the above processing parameters may be made according to the particular coating being applied. Mid-range chamber pressures, lower power output, and higher frequencies within the above-described ranges are generally preferred when a silicon dioxide coating is being applied to a substrate coated with an organosilicon interfacial layer. For example, high quality, uniform silicon dioxide coatings from silane and nitrous oxide may be formed on a PECVD-coated or conventionally-coated organosilicon interfacial surface at a deposition rate of about 500 Angstroms per minute when the silane flow rate (2% in He) is about 2500 sccm, the $N_2O$ flow rate is about 1625 sccm, the frequency is about 13.56 MHz, the reactor chamber pressure is about 1 torr, the power value is about 50 watts, and the substrate is heated to a temperature of about 100° C.

When an abrasion resistance equivalent to that of Pyrex ® is desired, the thickness of the top layer should be in the range of about 2.0 microns to about 5.0 microns. In general, though, the thickness of top layers applied by the method of the present invention may range from about 0.025 micron ato about 10.0 microns.

Additives to enhance various properties of the article of the present invention may be incorporated into either or both the interfacial layer and the top layer, and might also be incorporated into the primer layer, if present. The particular additives to be utilized will depend on the particular properties desired for the article, and also upon the manner in which the particular layer is being deposited. For example, a wide range of additives may be incorporated into the interfacial layer when it is applied to the substrate by conventional methods. Exemplary additives include ultraviolet light absorbers, anti-oxidants, fillers, reinforcing agents, and wetting agents.

The various embodiments of the present invention result in the formation of polycarbonate articles having a high degree of hardness and an abrasion resistance equivalent to that of glass. Furthermore, when the process is utilized to form transparent glazing materials top-coated with silicon dioxide, the resulting articles are very smooth and free from microcracks. Also, the interfacial layer provides a high level of adhesion between the top layer and the polycarbonate substrate, and is additionally capable of accommodating differences in thermal expansion therebetween.

EXAMPLES

The following examples are provided to more fully describe the present invention. It is intended that these examples be considered as illustrative of the invention, rather than limiting what is otherwise disclosed and claimed herein.

A brief description of the tests utilized in some or all of the following examples will now be given:

Abrasion resistance was measured by a combination of two ASTM test methods. The Taber Abrasion Test, ASTM D1044, was used with a 1,000 gram total weight load evenly distributed on the two wear wheels. 300 and/or 1,000 cycles were used, as indicated below. The second test method was ASTM D1003, which uses a Gardner Hazemeter, Model UX 10. In this method, the percentage of light scattering is measured before and after the specimen is taber-abraded. The lower the value, the better the abrasion resistance and hardness.

Optical transparency was measured on a UV-Visible Spectometer, Model 330, manufactured by the Perkin Elmer Corporation.

Infrared spectra were used to examine the molecular structure of the deposited coatings. The infrared device was a Nicolet 7199 FT-IR Spectrometer.

Adhesion was measured by two methods, the first being scribed adhesion by ASTM Test D3359, in which a 0.75 inch (1.9 cm) square of the material is cross-hatched into 2.0 mm squares. A 3M Company No. 610 adhesive tape is then pressed onto the surface of the grid pattern and removed with a swift, even pull. The amount of material remaining on the sample is indicative of the adherence characteristics of the coating to an underlying surface.

The second adhesion test is referred to as a "Sebastian Post Adhesion Test", in which an aluminum post terminated with an epoxy-coated stud is perpendicularly situated in or near the center of a 0.75 in $\times 0.75$ in portion of the sample, such that the epoxy contacts the surface. The sample is then heated to about 125° C. for about 2 hours to cure the epoxy to the surface. The post is then inserted, upside-down, into the Sebastian tester, which exerts a steady pull perpendicular to the sample surface until failure occurs. The equipment automatically calculates and displays the force (lbs/in$^2$) required to pull the post away from the surface.

Weathering performance was measured using two separate tests. The first test was a 65° C. water soak test, wherein the coated polycarbonate samples were immersed in distilled water maintained at 65° C. The test was run over 7 days, during which samples were removed daily, dried, examined, and then tested for adhesion using the scribed adhesion test. If the samples passed scribed adhesion, they were further evaluated by a QUV Accelerated Weathering Test. This test was carried out in a Model QUV Environmental Chamber manufactured by the Q-Panel Company. The samples placed in the chamber were exposed to 12 hour cycles consisting of 8 hour cycles at 70° C. with exposure to UV light (280 nm–350 nm, with a maximum at 313 nm), and 4 hour cycles at 50° C. and 100% relative humidity. Visual and microscopic examinations, as well as scribed adhesion measurements, were carried ot daily for the first week, twice weekly for the second and third weeks, and then once a week thereafter. It should be noted that some samples were tested with the 65° C. water soak test for periods of time greater than 7 days, while other samples were only tested with the QUV Accelerated Weathering Test.

The thickness of the layers applied to the substrate by plasma deposition was controlled and determined by process conditions and processing time. Once the reactant gas mix flow rate, substrate temperature, frequency, and pressure have been set, thickness can be determined within about ±5% by simply timing the duration of the process.

The thickness uniformity of an applied coating is assessed from the interference color produced by the coating; such a method is suitable for coatings having thicknesses of about 0.3 microns. For greater coating thicknesses (from about 0.4 micron–10 microns), a profilometer (Sloan Dektak II) provides a determination of coating uniformity. Small, thin silicon wafers are positioned at strategic locations prior to deposition of the coating and then removed afterwards, exposing the steps used for measuring thickness.

The pinhole-free quality of the layers was assessed from the barrier properties of the coatings to different gases. For such measurements, thicknesses ranging from about 250 Angstroms–1,000 Angstroms were used. Although these thicknesses were typically much less than those of most of the samples of Example 1, the process conditions were exactly the same as those used for making thicker top layers: hence, the absence of pinholes is inferred. Permeabilty was measured by several pieces of commercial equipment available from the Mocon Corporation. Periodic examinations of coatings carried out with a scanning electron microscope indicated that there were no pinholes.

EXAMPLE 1

Samples 1–12 all employed as a substrate a bisphenol A-based thermoplastic polycarbonate. The dimensions of each substrate were typically about 4.0 in ×4.0 in, with either a 0.125 in or 0.25 in thickness. Circular disks having a diameter of 3.0 in and a thickness of 0.125 in were also used where indicated below.

Samples 1–10 were within the scope of the present invention, whereas Samples 11–15 served as controls or comparison aids.

An acrylic-based interfacial layer was conventionally applied to the polycarbonate substrate of Samples 1 and 2. The acrylic material was a 50/50 by weight blend of two thermosettable acrylic emulsions supplied by the B. F. Goodrich Company: Hycar 237 and Hycar 256. The blend was diluted in water to about 3.5% by volume. 2.1% by weight of a UV screening agent (2-ethylhexyl-2-cyano-3,3-diphenylacrylate) and 0.05% by weight (50% solution) of a citric acid catalyst were added to the blend. The blend was then further diluted in 30% by volume of Poly-Solv EB, a glycol ether solvent sold by Olin Chemicals Company. The last-mentioned material was added in order to enhance the wetting capabilities of the interfacial layer to the surface. The acrylic material was applied to the substrate by dip coating, and was then heat-cured; the final coating thickness was 0.8 micron.

Samples 3–6 were each dip-coated with an interfacial layer-forming thermoplastic acrylic material containing about 2% by weight polyethylmethacrylte and about 4% by weight of a UV screening agent (2,4-dihydroxybenzophenone). The carrier solvent was ethylene glycol monobutyl ether. The thickness of this acrylic coating after heat-curing was 0.2 micron for Samples 3 and 4 and 0.8 micron for Samples 5 and 6.

Samples 7 and 8 included a dip-coated interfacial layer of an organosilicone material comprising a dispersion of colloidal silica in a solution of the partial condensate of an alkyl silanol which further included a UV screening agent. The thickness of this material after heat-curing was about 5.0 microns.

Samples 9 and 10 were flow-coated with an interfacial layer comprising 40% by weight solids of a butanol solution of a cross-linkable acrylic formulation. The formulation contained a 1:1 weight ratio of hexane diol diacrylate and trimethylpropane triacrylate. The composition further contained 40% by weight solids of colloidal silica functionalized with the hydrolysis product of methacryloxypropyltrimethoxy silane. The formulation also contained 2% by weight diethoxyactophenone as a UV initiator and 10% by weight of the benzenesulfonate ester of Cyasorb 5411 as a UV screening agent. After being applied, the interfacial layer was UV-cured to a thickness of about 7.0 microns by passage through a PPG Industries QC 1202 UV-processor operating at a line speed of about 20 ft/min and employing two medium pressure mercury lamps.

Samples 1–10 were top-coated in the reaction chamber of a PlasmaTherm Model 2411 plasma deposition device. Each sample was placed on the lower electrode, which was part of a capacitively-coupled plasma generation system as described above. A top layer of silicon dioxide was then applied to the interfacial layer by the following technique:

Silane was premixed with helium in a $SiH_4$:He volume ratio of 2:98 and fed through a mass flow controller valve into a central feed line. Nitrous oxide was also fed through a mass flow control valve into the same central feed line. The reactant gas mixture was then fed into the reaction chamber between the electrodes at a flow rate indicated in Table I. The following parameters are also provided in Table I for each of these samples: reaction chamber pressure, frequency value for the RF generator; plasma power; substrate surface temperature; and deposition rate.

Samples 11 and 12 were controls outside the scope of the present invention, and were formed by plasma-depositing silicon dioxide directly on polycarbonate according to the procedure described above.

Sample 13 was a 0.125 in thick sample of Pyrex ®, uncoated and outside the scope of the present invention. This sample was used for hardness and optical comparisons with the articles of the present invention.

Sample 14 was a 0.125 in thick sample of uncoated polycarbonate.

Sample 15 was a 0.125 in thick polycarbonate sample dip-coated with the organosilicone composition used for Samples 7 and 8. A top layer was not applied to this sample.

After the SiO$_2$-coated samples were removed from the reaction chamber and cooled to ambient temperature, they were subjected to the tests described above and indicated below in Table I.

PECVD pressure was 800 millitorrs for Samples 1-6, 11 and 12; 800-1,000 millitorrs for Samples 7 and 8; and 1,000 millitorrs for Samples 9 and 10.

PECVD power was 80 watts for Samples 1-6, 11 and 12; and 50 watts for Samples 7-10.

The data shown for Samples 7 and 8 is representative of data for a number of various organosilicone interfacial compositions.

The data shown for Samples 9 and 10 represents data for a number of samples having the same acrylic interfacial layer composition.

con wafers. The values typically ranged from 1.469 to 1.472.

Multiple Reflection Fourier Transform IR analysis on SiO$_2$ coatings deposited on silicon wafers in the reaction chamber during the deposition of SiO$_2$ for Sample 11 produced spectra characteristic of SiO$_2$. Transmission FT-IR measurements on silicon wafers with SiO$_2$ codeposited with most representative articles of Samples 7-10 gave similar spectra that were characteristic of SiO$_2$.

The refractive index and FT-IR measurements on Samples 2, 4, 6 and 7-10 indicated that the SiO$_2$ top layer composition was very stoichiometric. Furthermore, the SEM measurements indicated a very continuous, pinhole-free structure for the top layer.

Adhesion was measured by the scribed adhesion test described above for Samples 1-12. The results are shown in Table II.

TABLE I

PECVD DEPOSITION OF SIO$_2$ ONTO A POLYCARBONATE SUBSTRATE HAVING AN INTERFACIAL LAYER CONVENTIONALLY APPLIED THERETO

| Sample No. | IL[a] type | Thickness (μm) IL | TL[b] | Taber (%)[c] 300 cycles | 1000 cycles | PC (°C.)[e] | Flow Rate (sccm) SiH/He | NO | Deposition Rate (μ/min.) |
|---|---|---|---|---|---|---|---|---|---|
| 1 | A | 0.8 | 2.0 | 4.2 | — | 100 | 4000 | 2700 | .05 |
| 2 | A | 0.8 | 5.0 | 0.3 | 1.2 | 100 | 4000 | 2700 | .05 |
| 3 | A | 0.2 | 2.0 | 3.0 | — | 100 | 4000 | 2700 | .05 |
| 4 | A | 0.2 | 5.0 | 0.5 | — | 100 | 4000 | 2700 | .05 |
| 5 | A | 0.8 | 2.0 | — | — | 100 | 4000 | 2700 | .05 |
| 6 | A | 0.8 | 5.0 | 0.7 | 1.1 | 100 | 4000 | 2700 | .05 |
| 7 | OS | 5.0 | 2.0 | 0.5-1.2 | 1.1-2.0 | 100 | 2500 | 1625 | .035-.05 |
| 8 | OS | 5.0 | 5.0 | — | 0.4-0.6 | 100 | 2500 | 1625 | .05 |
| 9 | A | | 2.0 | 0.75-1.1 | 2.1-2.75 | 100 | 2500 | 1625 | .05 |
| 10 | A | | 3.0 | 0.5-0.75 | 1.65-2.15 | 100 | 2500 | 1625 | .05 |
| 11 | None | — | 2.0 | 18 | — | 100 | 4000 | 2700 | .05 |
| 12 | None | — | 5.0 | 0.9 | — | 100 | 4000 | 2700 | .05 |
| 13 (Pyrex) ® | None | — | None | 0.4 | 1.0 | 100 | — | — | — |
| 14 | None | — | None | 30[d] | — | 100 | — | — | — |
| 15 | OS | 5.0 | None | 6.2 | 27.9 | 100 | — | — | — |

[a]IL = Interfacial Layer; A = acrylic; OS = organosilicone
[b]TL = Top Layer
[c]Taber Value is measurement of percentage of light scattering.
[d]Polycarbonate was severely abraded and damaged after only 50 cycles.
[e]Temperature of substrate surface during PECVD.
Note: PECVD frequency for all samples was 13.56 MHz.

The data in Table I demonstrates that articles formed by applying a suitable thickness of SiO$_2$ by PECVD to a substrate having an interfacial layer coated thereon results in an article having excellent hardness and abrasion resistance. For example, Samples 4, 6, 7 and 10 exhibited an abrasion resistance comparable to that of Pyrex ® after 300 Taber cycles. Furthermore, Samples 2, 6 and 8 exhibited an abrasion reistance comparable to that of Pyrex ®, even after 1,000 Taber cycles.

Samples 2, 4, 6 and 12, as well as representative articles of Samples 7 and 8, were examined for optical transparency. On the basis of optical transmission measurements, the top layer and the interfacial layer were both completely transparent in the visible spectra region (400 nm-800 nm).

UV transmission measurements of PECVD-deposited SiO$_2$ on top of Suprasil quartz demonstrated that the UV transmission cannot be distinguished from that of the quartz.

Refractive index measurements using a Pulfrich Refractometer on Samples 6 and 12 gave values of 1.470 for each sample, an indication of high quality SiO$_2$.

Refractive index measurements were made ellipsometrically during the deposition of thinner coatings of PECVD-deposited SiO$_2$ (1000 Angstroms) onto silicon wafers.

TABLE II

SCRIBED ADHESION DATA FOR EXAMPLE 1

| Sample No. | Adhesion (% Removal) |
|---|---|
| 1 | 0 |
| 2 | 5-15 |
| 3 | 0 |
| 4 | 35-65 |
| 5 | 0 |
| 6 | 15-25 |
| 7 | 0-90 |
| 8 | 0-90 |
| 9 | 10-100 |
| 10 | 10-100 |
| 11 | 0 |
| 12 | 0 |
| 13 | — |
| 14 | — |
| 15 | 0 |

The wide variation in adhesion shown for Samples 7-10 arises from two causes. First, the adhesion of SiO$_2$ on the interfacial layers is strongly affected by surface cleaning and etching, and by the loss of material from the interfacial layer surface during deposition (since such removed material essentially competes against the deposition process). The etching process had not been optimized for some of the initial trials of Samples 7 and 8. In the case of Samples 9 and 10, it is believed that incomplete solvent removal from the interfacial layer produced the poor adhesion: this was correced by completion of the solvent removal before deposition, resulting in the high adhesion values (i.e., 10%).

Second, it was determined that the scribed adhesion test produces a more severe est on the $SiO_2$ surface than it does on the interfacial layer surface. To support this conclusion, Samples 16 and 17 were subjected to the post adhesion test described above. Each sample had been formed by dip-coating an organosilicone interfacial layer onto a polycarbonate substrate, and then plasma-depositing $SiO_2$ by the process used for the other samples of Example 1. Post adhesion was measured before and after $SiO_2$ deposition. For the purpose of comparison, another portion of the surface of each $SiO_2$-coated sample was subjected to the scribed adhesion test.

TABLE III

| POST-ADHESION/SCRIBED ADHESION COMPARISON | | |
|---|---|---|
| | Sample 16 | Sample 17 |
| | (psi)[a] | (psi)[a] |
| Sample without $SiO_2$ (Post-Adh.) | 1070 | 1310 |
| Sample with $SiO_2$ (Post-Adh.) | 2430 | 3070 |
| | (%)[b] | (%)[b] |
| Sample with $SiO_2$ (Scribed-Adh.) | 10% | 90% |

[a]Force required to remove Sebastian post.
[b]Percentage of material removed by tape.

Table III demonstrates that Samples 16 and 17 both exhibited very good adhesion as measured by the post-adhesion test. The table further demonstrates that the scribed adhesion test is not always a reliable indicator of adhesion for $SiO_2$-coated articles.

Weathering (QUV) tests on many samples prepared under the same or similar conditions to those of Samples 7 and 8 were conducted for periods ranging from 1 to 4 months. Good retention of adhesion and optical properties was generally observed, demonstrating excellent $SiO_2$ adhesion when an interfacial layer is employed.

EXAMPLE 2

In this example, organosilicone interfacial layers were applied by PECVD to a series of polycarbonate substrates, followed by the PECVD deposition of $SiO_2$ onto the interfacial layer.

Polycarbonate substrates representing Samples 18-25 and having dimensions of about 4.0 in ×4.0 in ×0.125 in were individually placed on top of the lower electrode of a capacitively-coupled plasma deposition apparatus similar to that used in Example 1. Samples 26 and 27 were polycarbonate substrates similar to Samples 18-25, but were not provided with an interfacial layer, instead acting as controls.

Hexamethyldisiloxane (HMDS) monomer was fed through a valve and a feed line into the reaction chamber under the operating conditions listed in Table IV. The substrate surface was maintained at a temperature of about 100° C. during deposition.

After deposition, each sample was cooled and removed from the chamber. The thickness of the polymerized organosilicone material as measured by profilometry is indicated in Table IV, wherein other relevant parameters are also listed.

The interfacial layer for Samples 18-25 was very smooth and transparent, with 90% transmission in the 400 nm–800 nm region, and 65% transmission at 300 nm. Furthermore, the thickness of each layer varied no more than ±10% from the layer's average thickness.

Each interfacial layer appeared to be free of pinholes, based on SEM analysis. It should be noted that at the high deposition rates utilized for Samples 24 and 25, the formation and deposition of powder onto the coating surface occurred, leading to some surface defects. Decreasing the deposition rate or using helium dilution would eliminate these defects.

The adhesion of each interfacial layer to the polycarbonate surface was excellent. For example, when the scribed adhesion test was used, 100% adhesion was observed.

Each sample, including Samples 26 and 27, was then individually placed in the PlasmaTherm Model 2411 device as described in Example 1. Samples 19-26 were etched in nitrogen at 100° C. Sample 27 was etched in $CF_4/O_2$ at 100° C. A 2.0 μm layer of $SiO_2$ (1.0 μm for Sample 26) was applied to the interfacial layer of each sample according to the method of Example 1, under the following conditions:

Plasma: Frequency: 13.56 mHz; Power: 50 watts.
Flow Rate: $SiH_4$(2%)/He: 2500 sccm $N_2O$: 1625 sccm
Pressure: 1000 millitorrs
Deposition Rate: 0.0352 μm/min.
Substrate Surface Temperture: 100° C.

TABLE IV

| PLASMA DEPOSITION CONDITIONS FOR INTERFACIAL LAYER | | | | | |
|---|---|---|---|---|---|
| Sample No. | Pressure (Torr) | F.R.[a] (Sccm) | Power[b] (Watts) | Thickness (μm) | Dep. Rate Angstroms/min. |
| 18 | 0.6 | 8 | 50 | 1.2 | 193 |
| 19 | 0.3 | 7 | 50 | 0.6 | 162 |
| 20 | 0.3 | 21 | 50 | 1.8 | 292 |
| 21 | 0.6 | 18 | 50 | 1.5 | 250 |
| 22 | 0.3 | 37 | 50 | 1.1 | 190 |
| 23 | 0.3 | 37 | 50 | 1.1 | 190 |
| 24 | 0.3 | 40 | 225 | 3.9 | 656 |
| 25 | 0.3 | 40 | 225 | 3.9 | 656 |

[a]F.R. = Flow Rate
[b]Deposition was carried out at a plasma frequency of 75 kHz After formation of the $SiO_2$ layer, abrasion resistance data and weatherability performance were measured for the article of Samples 18-27, as shown in Table V below. A "pass" rating for samples after the water soak indicated that no delamination or damage occurred on the surface.

TABLE V

| | | 65° C. Water Soak[b] | |
|---|---|---|---|
| Sample No. | Taber %[a] | 1 week | 2 weeks |
| 18 | 2.2 | pass | — |
| 19 | 1.1 | pass | edge delamination |
| 20 | — | pass | delamination |
| 21 | — | pass | edge delamination |
| 22 | — | pass | pass |
| 23 | 3.3 | — | — |
| 24 | — | pass | pass |
| 25 | 1.9 | — | — |
| 26 | — | delamination (8 hrs.) | — |
| 27 | — | delamination (5 hrs.) | — |

[a]Percentage of light scattering after 300 cycles.
[b]Samples placed in 65° C. water were examined everyday for the first week and twice thereafter.

The data in Table V demonstrates that abrasion resistance for each sample of the present invention was acceptable. Furthermore, weatherability for most of Samples 18-25 was generally good.

The SiO₂ top layer for all samples was free of pinholes and microcracks.

Use of the interfacial layer also resulted in post-water soak adhesion being superior to that exhibited when the interfacial layer was not used, i.e., control samples 26 and 27. It is therefore clear that the interfacial layer is acting as an expansion compensation layer between the polycarbonate and the SiO₂ during heating and testing cycles.

Modification and variations of the present invention are possible in light of the above teachings. It should therefore be understood that changes may be made in the particular embodiments of the invention described which are within the full intended scope of the invention as defined by the appended claims.

What is claimed is:

1. A method for forming an abrasion-resistant article, comprising the steps of:
   (a) Applying an interfacial layer on the surface of a polycarbonate substrate wherein the interfacial layer comprises a curable organopolysiloxane composition containing a dispersion of colloidal silica in a solution of the partial condensate of a silanol having the formula RSi(OH)3 or R2Si(OH)2, wherein R is selected from the group consisting of alkyl groups having about 1 to 3 carbon atoms and aryl groups having about 6 to 20 carbon atoms, wherein at least 70 weight percent of the silanol is CH3Si(OH)3 or (CH3)2Si(OH)2 in a mixture of an aliphatic alcohol and water; and
   (b) Applying an abrasion-resistant top layer containing a material selected from the group consisting of silicon carbide, silicon dioxide, silicon nitride, silicon oxynitride, boron oxide, boron nitride, aluminum oxide, aluminum nitride, and titanium dioxide, on the interfacial layer by:
   (i) situating the polycarbonate substrate having the interfacial layer disposed thereover in a reactor chamber which is pressurized at between about 50 millitorrs and about 10 torrs; and
   (ii) passing into the reactor chamber with a carrier gas at least one gaseous reactant capable of reacting to form the composition of said top layer in a laminar flow having a Reynolds value of about 2.5 relative to the surface of the interfacial layer at a flow rate of between 500 sccm and 10,000 sccm while generating an electric field in the chamber to form a sustained plasma of the gaseous reactant, wherein the plasma is formed by an electrical generator operating at dc or at ac frequencies of between about 50 Hz and about 10 GHz and at a power value of between 10 watts and 5000 watts, said substrate being heated to a temperature between about room temperature and 130° C., said gaseous reactant reacting in the plasma and on the interfacial layer to form said top layer.
2. The article produced by the method of claim 1.

* * * * *